US007231271B2

(12) United States Patent
Gopalan et al.

(10) Patent No.: US 7,231,271 B2
(45) Date of Patent: Jun. 12, 2007

(54) STEGANOGRAPHIC METHOD FOR COVERT AUDIO COMMUNICATIONS

(75) Inventors: Kaliappan Gopalan, Munster, IN (US); Stanley J. Wenndt, Rome, NY (US); Darren Haddad, Frankfort, NY (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 758 days.

(21) Appl. No.: 10/768,753

(22) Filed: Jan. 21, 2004

(65) Prior Publication Data

US 2005/0159831 A1 Jul. 21, 2005

(51) Int. Cl.
*H04L 9/00* (2006.01)

(52) U.S. Cl. ........................ 700/94; 380/252; 370/495

(58) Field of Classification Search ................ 380/252, 380/253; 370/494, 495; 379/93.08, 93.18
See application file for complete search history.

(56) References Cited

U.S. PATENT DOCUMENTS 3,845,391 A * 10/1974 Crosby ........................ 380/253
4,225,967 A * 9/1980 Miwa et al. ................ 370/496
5,450,490 A * 9/1995 Jensen et al. ............... 380/253

* cited by examiner

*Primary Examiner*—Daniel Swerdlow
(74) *Attorney, Agent, or Firm*—Joseph A. Mancini

(57) ABSTRACT

Method for embedding a covert message within a digital audio signal. The existence of the covert message is undetectable and the information content of the covert message can be further rendered unascertainable. Covert message data is embedded within a digital audio signal on an audio frame-by-audio frame basis. Covert message data is embedded either at a rate of one bit per frame or two bits per frame. The invention has uses including but not limited to watermarking digital audio signals, hiding data within a digital audio signal, increasing the channel capacity of a communications channel by placing multiple messages within each other, and generally increasing message robustness.

14 Claims, 3 Drawing Sheets

STEGANOGRAPHIC METHOD FOR COVERT AUDIO COMMUNICATIONS

STATEMENT OF GOVERNMENT INTEREST

The invention described herein may be manufactured and used by or for the Government of the United States for governmental purposes without the payment of any royalty thereon.

BACKGROUND OF THE INVENTION

Covert speech communication is concerned with transmitting vital audio information via an innocuous cover audio in a secure and robust manner. It is an application of the art and science of steganography, or data embedding, that has been increasingly gaining importance in the all-encompassing field of information technology. While cryptography conceals the information contents being transmitted, steganography conceals the existence of covert information in the cover medium, be it audio, image, or video. In encryption, the message audio signal, for instance, is itself altered in such a way that it renders the resulting data unintelligible. Although persons without the encryption key cannot decipher the signal, transmitting encrypted information, in general, arouses suspicion about the presence of hidden information. For battlefield communication, in particular, hiding the existence of information is, therefore, crucial. Using a host medium as a wrapper or carrier in steganography, the covert information is kept intact as opposed to modifying it in cryptography.

Steganography, in general, relies on the imperfection of the human auditory and visual systems. Image and video steganography exploit the low visual sensitivity in perceiving changes in luminance of greater than one in 30 of random patterns, or one in 240 in uniform levels of gray, for example [1]. Audio steganography takes advantage of the psychoacoustical masking phenomenon of the human auditory system (hereinafter, HAS). Psychoacoustical, or auditory, masking is a perceptual property of the HAS in which the presence of a strong tone renders a weaker tone in its temporal or spectral neighborhood imperceptible [2]. This property arises because of the low differential range of the HAS even though the dynamic range covers 80 dB below ambient level [2]. In temporal masking, a faint tone becomes undetected when it appears immediately before or after a strong tone. Frequency masking occurs when human ear cannot perceive frequencies at lower power level if these frequencies are present in the vicinity of tone- or noise-like frequencies at higher level. Additionally, a weak pure tone is masked by wide-band noise if the tone occurs within a critical band. We must note that the masked sound becomes inaudible in the presence of another louder sound; the masked sound, faint as it may be, is still present, however. This property of inaudibility of weaker sounds is used in different ways for embedding information. In the case of embedding in phase or amplitude, for example, the phase or amplitude of a frequency-masked sample in the spectral domain is altered in accordance with information bit to be embedded [3-5]. Instead of modifying the host sample, the present work inserts tones at low power to conceal information.

REFERENCES

[1] W. Bender, D. Gruhl, N. Morimoto and A. Lu, "Techniques for data hiding," *IBM Systems Journal*, Vol. 35, Nos. 3 & 4, pp. 313-336, 1996.

[2] E. Zwicker and H. Fastl, *Psychoacoustics*, Sprigger-Verlag, Berlin, 1990.

[3] M. D. Swanson, M. Kobayashi, and A. H. Tewfik, "Multimedia data-embedding and watermarking technologies," Proc. IEEE, Vol. 86, pp. 1064-1087, June 1998.

[4] K. Gopalan, D. S. Benincasa, and S. J. Wenndt, "*Data Embedding in Audio Signals*," Proc. of the 2001 IEEE Aerospace Conference, Big Sky, Mont., March 2001.

[5] K. Gopalan, "Audio Steganography for Embedding Compressed Speech," Proc. of the IASTED International Conference on Signal and Image Processing (SIP 2001), Kauai, Hi., August 2002.

OBJECTS AND SUMMARY OF THE INVENTION

One object of the present invention is to provide a method for communicating digital audio information covertly.

Another object of the present invention is to make existence of the covert digital audio message undetectable.

Yet another object of the present invention is to make the information content of the covert digital audio message unascertainable.

The invention described herein enables a message to be covertly embedded with a digital audio signal. The existence of the covert message is undetectable and the information content of the covert message can be further rendered unascertainable. Covert message data is embedded within a digital audio signal on an audio frame-by-audio frame basis. Covert message data is embedded either at a rate of one bit per frame or two bits per frame. The invention has uses including but not limited to watermarking digital audio signals, hiding data within a digital audio signal, increasing the channel capacity of a communications channel by placing multiple messages within each other, and generally increasing message robustness.

According to an embodiment of the present invention, a steganographic method for embedding data for covert audio communications comprises inputting a digital host audio signal, dividing said host audio signal into non-overlapping frames, computing the frame power $f_e$, inputting a digital signal to be embedded, determining whether a "0" is to be embedded, if it is determined that a "0" is to be embedded, then the power of a tone at $f_0$ is set to a percentage of the power of $f_e$ and the power of a tone at $f_1$ is set to a fraction of the power of said tone at $f_0$, embedding said tone at $f_0$ and the tone at $f_1$ into the frame of the host audio signal, transmitting the frame of the host audio signal, inputting next frame of the host audio signal and next bit of the digital signal to be embedded and returning to the step of determining. If it is determined that a "0" is not to be embedded, then the power of a tone at $f_1$ is set to a percentage of the power of $f_e$ and the power of a tone at $f_0$ is set to a fraction of the power of said tone at $f_1$ and the process is returned to the step of embedding.

According to the same embodiment of the present invention, a steganographic method for recovering embedded data for covert audio communications comprises the steps of receiving a digital audio signal containing an embedded digital signal, dividing the received audio signal into non-overlapping frames, computing the frame power $f_e$ of each non-overlapping frame of the received digital host audio signal, and determining whether the ratio $(f_e/f_0)$ is greater than the ratio $(f_e/f_1)$. If $(f_e/f_0)$ is greater than $(f_e/ f_1)$ the embedded bit is declared to be a "0" and the process is returned to the step of computing the frame power for the next frame of the received digital host audio signal.

If it is determined that the ratio ($f_e/f_0$) is less than the ratio ($f_e/f_1$), the embedded bit is declared to be a "1" and the process is returned to the step of computing the frame power for the next frame of the received digital host audio signal.

Advantages and New Features

There are several advantages and new features of the present invention relative to the prior art.

An important advantage is the fact that the present invention provides a method for covert audio communications wherein the presence of an embedded message is undetectable through audio means.

An equally important advantage is the fact that the present invention provides a method for covert audio communications wherein the presence of an embedded message is undetectable through electronic means such as spectrographics.

A related advantage is the fact that the present invention provides a method for covert audio communications wherein an embedded message is not susceptible to unauthorized modification.

DETAILED DESCRIPTION OF THE PREFERRED EMBODIMENT

The present invention provides a method for the embedding of a covert audio message into a cover audio message. The resulting signal contains both the cover audio message and the covert audio message. The covert audio message may be used for watermarking, secure communication, covert communication, and for increased channel capacity. Low power tone insertion relies on frequency masking where low power tones are inaudible if presented in the frequency vicinity of other tones or noises that are at a higher level.

A first embodiment of the present invention provides a method for embedding one bit per frame of audio data where a frame of audio data is 16 milliseconds. A second embodiment of the present invention provides a method for embedding two bits of information for a frame of audio data.

Embedding One Bit Per Audio Frame

Figure 1:
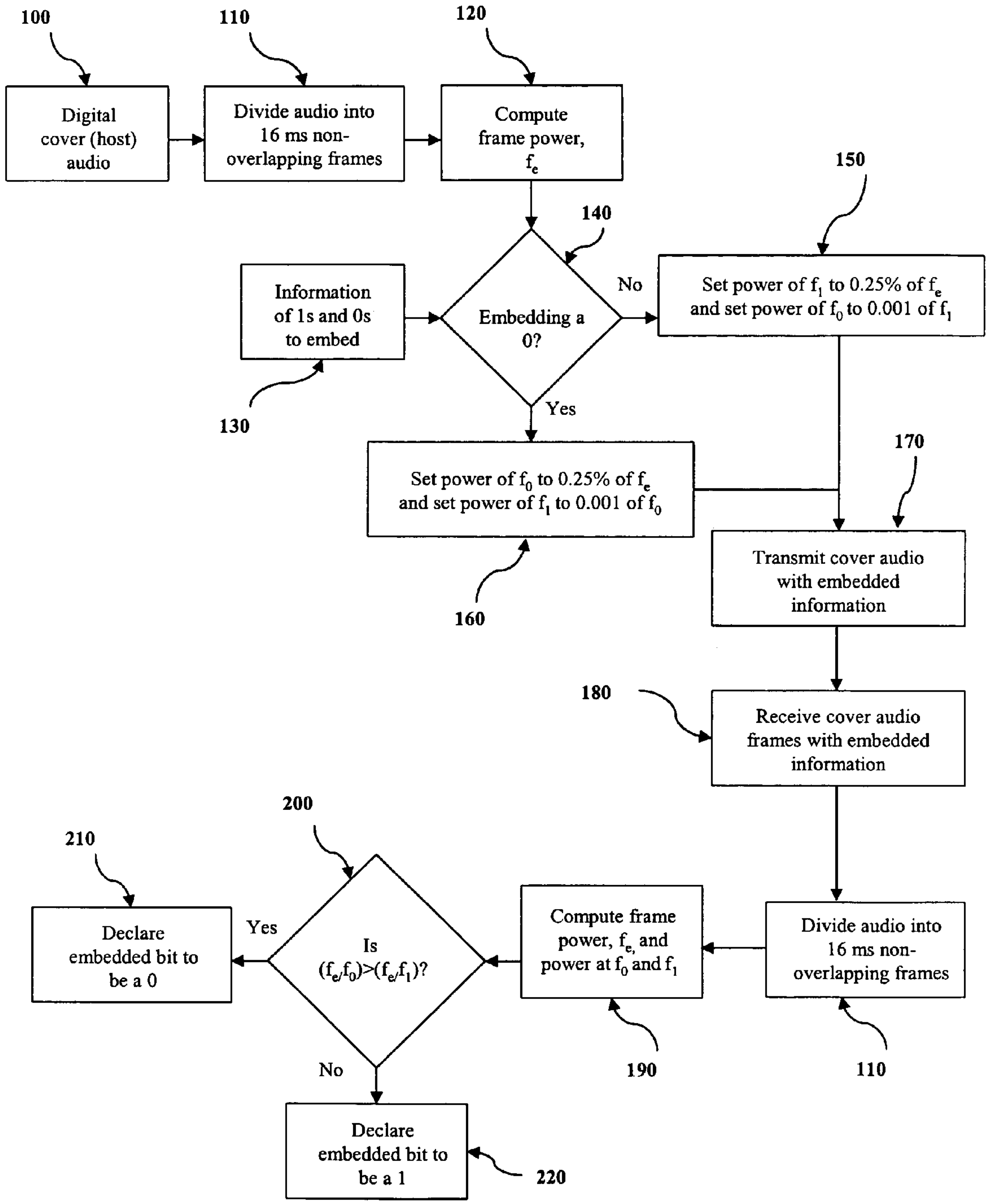
FIG. 1 depicts a flowchart of the process of embedding and recovering one bit of information as performed by the present invention.

Referring to FIG. 1, the flow diagram for the steps of embedding and recovering one bit of information per audio frame is depicted. Note that the embedded information is generically labeled ones and zeros to be embedded. These ones and zeros may be an audio signal, a watermark, or other coded information.

The digital cover or "host" audio signal is first provided. 100 To embed one bit of information, two tones at frequencies $f_0$ and $f_1$ are selected and generated for embedding bit 0 and bit 1 respectively. The host audio is divided 110 into non-overlapping segments of length 16 milliseconds. In this embodiment of the present invention $f_0$ is 1875 Hz and $f_1$ is 2625 Hz (16 bits per sample, 16000 samples/second, 256-point DFT), but other combinations of $f_0$ and $f_1$ will work equally well. For every frame of host audio, the frame power $f_e$, is computed 120 and only one bit is embedded 130 into the host audio frame. If it is determined 140 that the bit to be embedded is a 0, then the power of $f_0$ is set 160 to 0.25% of the power of $f_e$ and the power of $f_1$ is set 160 to 0.001 of the power of $f_0$. If it is determined 140 that the bit to be embedded is a 1, then the power of $f_1$ is set 150 to 0.25% of the power of $f_e$ and the power of $f_0$ is set 150 to 0.001 of $f_1$. The cover audio with embedded information is then transmitted. 170

The simultaneous adjustment of significant (0.25%) and extremely low powers to the tones offers two advantages. First, it avoids one or both of the tones being detected in hearing—if only one of the tones is set to a fixed power ratio relative to the frame power, the other tone may be heard in some cases where the host frame inherently has a substantial component at the tone frequency. The second advantage is that a known high/low ratio of power between the tones facilitates the detection of the embedded bit even when the embedded amplitudes are scaled or quantized. The frames, having their spectral components at the tone frequencies set in accordance with the data bits, constitute the stego signal. In this embodiment of the present invention the frame-embedded signal is quantized to 16 bits, the same as the original host audio signal.

For the recovery of the covert information, the cover audio with embedded information is received 180. The received audio is then divided 110 into non-overlapping segments of length 16 milliseconds and the frame power $f_e$ and the power at $f_0$ and $f_1$ are computed 190 for every frame of received audio. If it is determined 200 that the ratio $(f_e/f_0)>(f_e/f_1)$, then the embedded covert bit is declared 210 to be a 0. Otherwise, the embedded covert bit is declared 220 to be a 1.

Embedding Two Bits Per Audio Frame

Figure 2:
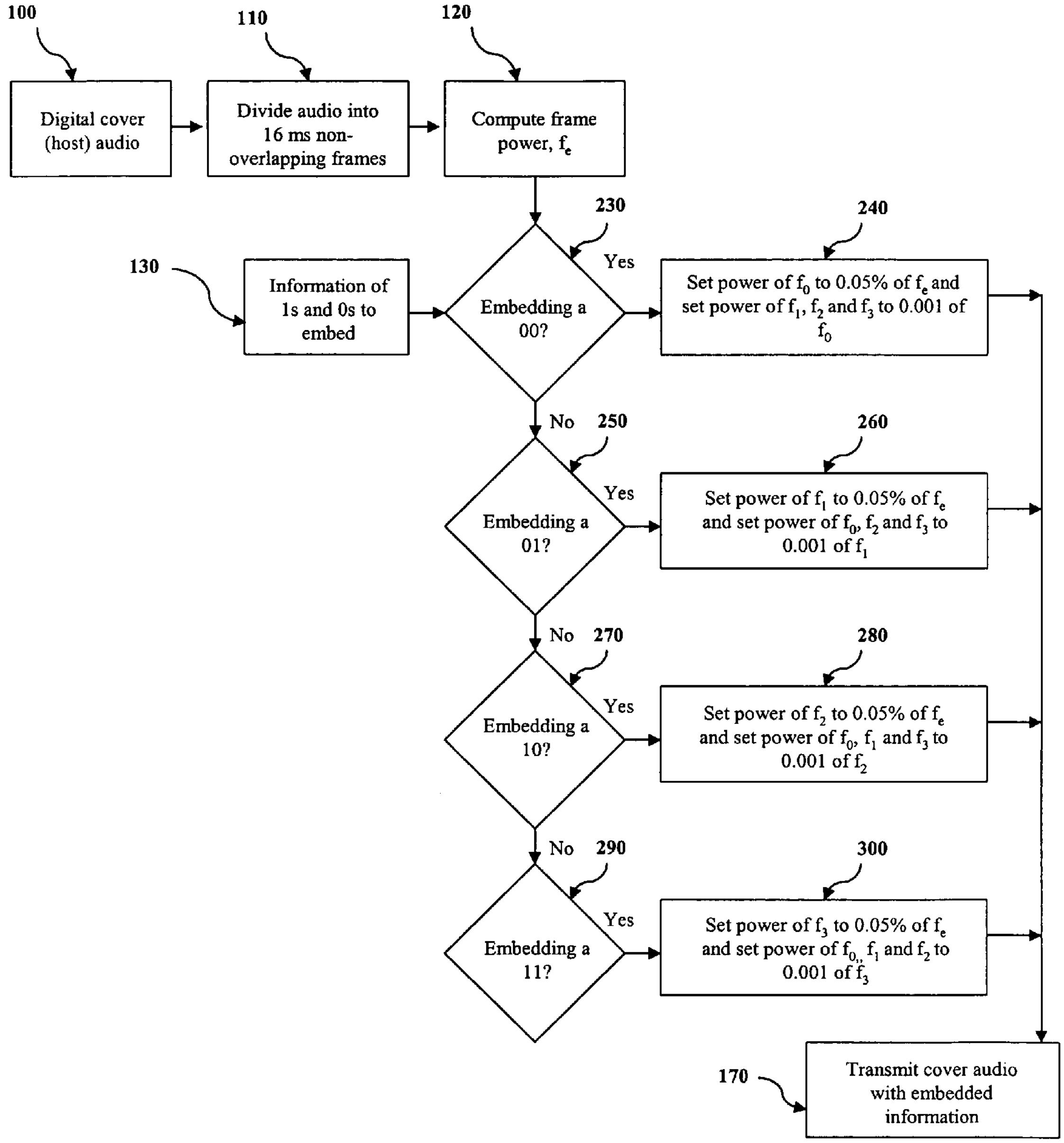
FIG. 2 depicts a flowchart of the process of embedding two bits of information as performed by the present invention.

Referring to FIG. 2, the flow diagram for the steps of embedding two bits of information per audio frame is depicted. As in embedding one bit (see FIG. 1) the digital cover or "host" audio signal is first provided. 100 Likewise, the host audio is then divided 110 into non-overlapping segments of length 16 milliseconds. For every frame of host audio, the frame power $f_e$, is computed 120 and only two bits are embedded 130 into the host audio frame. To embed two bits of information, four frequencies are needed, $f_0$, $f_1$, $f_2$, and $f_3$. For this embodiment of the present invention, the chosen frequencies are 687.5, 1187.5, 1812.5, and 2562.5 Hz (16 bits per sample, 16000 samples/second, 256-point DFT), but other frequencies would work equally well. If it is determined 230 that the bits to be embedded are 00, then $f_0$ is set 240 to 0.05 of the frame power, $f_e$, and the other frequencies, $f_1$, $f_2$, and $f_3$, are set 240 to 0.001 of $f_0$. Likewise, if it is determined 250 that the bits to be embedded are 01, $f_1$ is set 260 to 0.05 of $f_e$ and the others are set 260 to 0.001 of $f_1$. If it is determined 270 that the bits to be embedded are 10, $f_2$ is set 280 to 0.05 of $f_e$ and the others are set 280 to 0.001 of $f_2$. Finally, if it is determined 290 that the bits to be embedded are 11, $f_3$ is set 300 to 0.05 of $f_e$ and the others are set 300 to 0.001 of $f_3$. The cover audio with embedded information is then transmitted. 170

Figure 3:
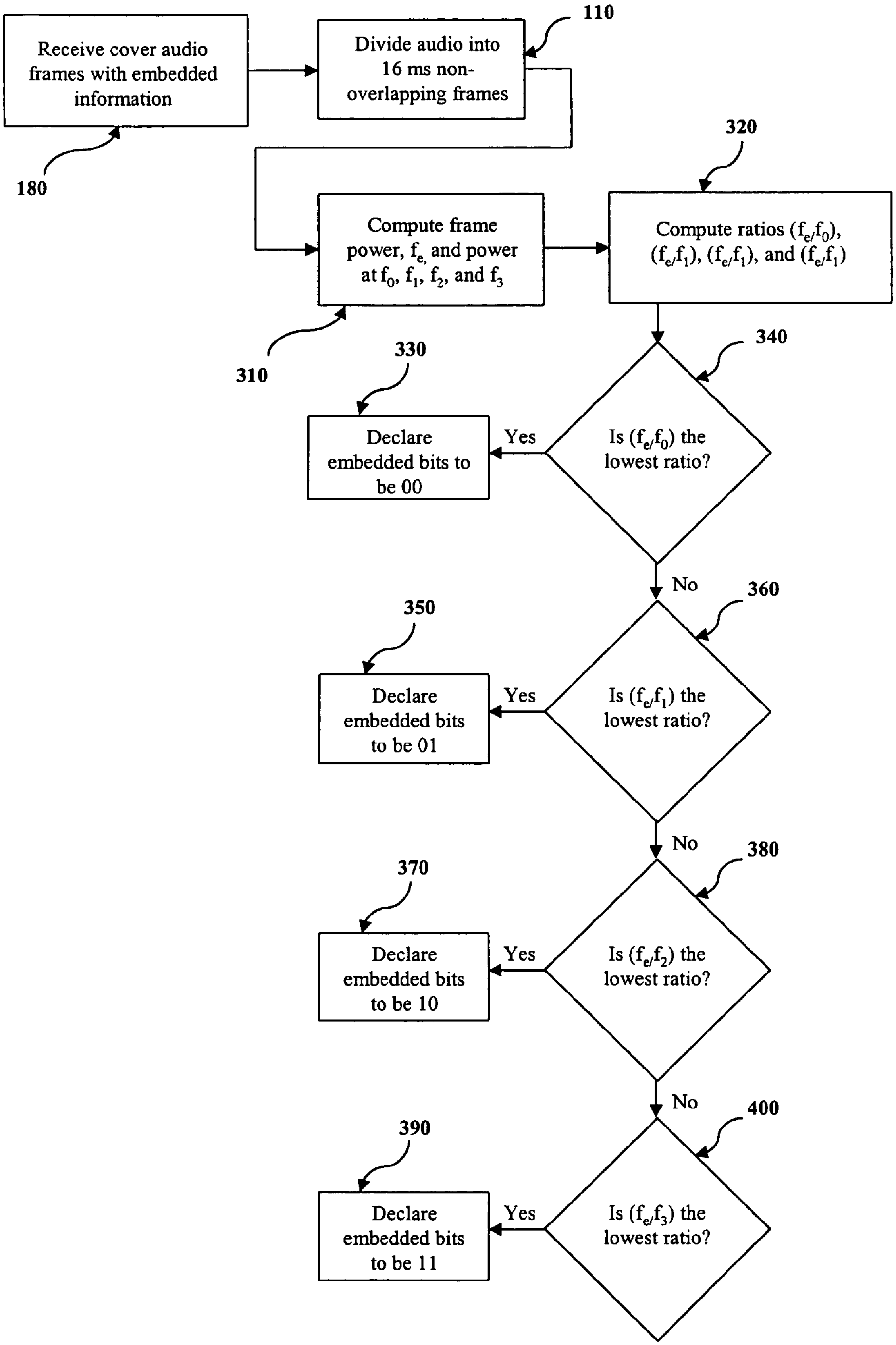
FIG. 3 depicts a flowchart of the process of recovering two bits of embedded information as performed by the present invention.

Referring to FIG. 3, the flow diagram for the steps of recovering two embedded bits of information per audio frame is depicted. The cover audio with embedded information is received 180 and the audio is then divided 110 into non-overlapping segments of length 16 milliseconds. The frame power $f_e$ and the power at $f_0$, $f_1$, $f_2$ and $f_3$ are computed 310 for every frame of received audio. Four ratios are computed 320, $(f_e/f_0)$, $(f_e/f_1)$, $(f_e/f_2)$, and $(f_e/f_3)$. The lowest ratio provides the key decoding the two embedded bits. If it is determined 340 the ratio $(f_e/f_0)$ is the lowest ratio, then a 00 is declared 330 as the embedded covert bits sent. If it is determined 360 the ratio $(f_e/f_1)$ is the lowest ratio, then a 01 is declared 350 as the embedded covert bits sent. If it is determined 380 the ratio $(f_e/f_2)$ is the lowest ratio, then a 10 is declared 370 as the embedded covert bits sent. If it is determined 400 the ratio $(f_e/f_3)$ is the lowest ratio, then a 11 is declared 390 as the embedded covert bits sent.

With four tones, however, an additional step is necessary to prevent the detection of embedding. The presence of a continuous stream of zeros or ones in the covert data, may result in the same tone being set at 0.25% of the corresponding frame power. Although a listener should not be able to perceive the tone because of its low power, the spectrogram is likely to show 'holes' at the remaining three tone frequencies where the power level is very low over a period of time. To a malicious attacker, these artifacts of frequencies are indicative of host manipulation even without the knowledge of host spectrogram. To avoid such an obvious detection of embedding, a binary key of the same size as the size of data to embed is used for each successive pair of data bits in this embodiment of the present invention. A pair of bits from the key determines which of the four tones is set at 0.25% of current frame power while the others are set at negligible power. Note that each successive pair of key bits sets the order of the four tones with the one for the 0.25% power at the first. (To reduce the size of the key, one skilled in the art may use a smaller key and repeat the tone order). Using the same key at the receiver, the dominant tone frequency and the order of the other three tones is first established. Then, the minimum of the ratio of the frame power to tone powers, along with this order, is used to determine the embedded bit pair.

While the preferred embodiments have been described and illustrated, it should be understood that various substitutions, equivalents, adaptations and modifications of the invention may be made thereto by those skilled in the art without departing from the spirit and scope of the invention. Accordingly, it is to be understood that the present invention has been described by way of illustration and not limitation.

What is claimed is:

1. In the field of audio communication, a steganographic method for embedding data, comprising the steps of:

a first step of inputting a digital host audio signal;
dividing said host audio signal into non-overlapping frames;
computing the frame power $f_e$;
a second step of inputting a digital signal to be embedded;
determining whether a "0" is to be embedded;
IF a "0" is to be embedded; THEN
setting the power of a tone at $f_0$ to a percentage of the power of $f_e$;
setting the power of a tone at $f_1$ to a fraction of the power of said tone at $f_0$;
embedding said tone at $f_0$ and said tone at $f_1$ into said frame of said host audio signal;
transmitting said frame of said host audio signal;
inputting next frame of said host audio signal and next bit of said digital signal to be embedded; and
returning to said step of determining;
OTHERWISE;
setting the power of a tone at $f_1$ to a percentage of the power of $f_e$;
setting the power of a tone at $f_0$ to a fraction of the power of said tone at $f_1$; and
returning to said step of embedding.

2. Method of claim 1, further comprising a steganographic method for recovering embedded data, comprising the steps of:

receiving a digital audio signal containing an embedded digital signal;
dividing said received audio signal into non-overlapping frames;
computing the frame power $f_e$ of each said non-overlapping frame of said received digital host audio signal;
determining whether $(f_e/f_0)>(f_e/f_1)$
IF $(f_e/f_0)>(f_e/f_1)$, THEN
declaring the embedded bit to be a "0"; and
returning to said step of computing said frame power for the next frame of said received digital host audio signal;
OTHERWISE,
declaring the embedded bit to be a "1"; and
returning to said step of computing said frame power for the next frame of said received digital host audio signal.

3. Method of claim 1, wherein said non-overlapping frames are 16 milliseconds in length.

4. Method of claim 2, wherein said non-overlapping frames are 16 milliseconds in length.

5. Method of claim 1, wherein said power of said tone at $f_0$ is 0.25% the power of $f_e$; and
said power of said tone at $f_1$ is 0.001 of the power of said tone at $f_0$ whenever a "0" is to be embedded.

6. Method of claim 1, wherein said power of said tone at $f_1$ is 0.25% the power of $f_e$; and
said power of said tone at $f_0$ is 0.001 of the power of said tone at $f_0$ whenever a "1" is to be embedded.

7. In the field of audio communication, a steganographic method for embedding two bits of data, comprising the steps of:

a first step of inputting a digital host audio signal;
dividing said host audio signal into non-overlapping frames;
computing the frame power $f_e$;
a second step of inputting a digital signal to be embedded;
a first step of determining whether a "00" is to be embedded;
IF a "00" is to be embedded; THEN
setting the power of a tone at $f_0$ to a percentage of the power of $f_e$;
setting the power of tones at $f_1$, $f_2$ and $f_3$ to a fraction of the power of said tone at $f_0$;
embedding said tone at $f_0$ and said tones at $f_1$, $f_2$ and $f_3$ into said frame of said host audio signal;
transmitting said frame of said host audio signal;
inputting next frame of said host audio signal and next two bits of said digital signal to be embedded; and
returning to said first step of determining;
OTHERWISE;
a second step of determining whether a "01" is to be embedded;
IF a "01" is to be embedded; THEN
setting the power of a tone at $f_1$ to a percentage of the power of $f_e$;
setting the power of tones at $f_0$, $f_2$ and $f_3$ to a fraction of the power of said tone at $f_1$;
embedding said tone at $f_1$ and said tones at $f_0$, $f_2$ and $f_3$ into said frame of said host audio signal;
transmitting said frame of said host audio signal;

inputting next frame of said host audio signal and next two bits of said digital signal to be embedded; and returning to said first step of determining;

OTHERWISE;

a third step of determining whether a "10" is to be embedded;

IF a "10" is to be embedded; THEN setting the power of a tone at $f_2$ to a percentage of the power of $f_e$;

setting the power of tones at $f_0$, $f_1$ and $f_3$ to a fraction of the power of said tone at $f_2$;

embedding said tone at $f_2$ and said tones at $f_0$, $f_1$ and $f_3$ into said frame of said host audio signal;

transmitting said frame of said host audio signal;

inputting next frame of said host audio signal and next two bits of said digital signal to be embedded; and returning to said first step of determining;

OTHERWISE;

a fourth step of determining whether a "11" is to be embedded;

IF a "11" is to be embedded; THEN setting the power of a tone at $f_3$ to a percentage of the power of $f_e$;

setting the power of tones at $f_0$, $f_1$ and $f_2$ to a fraction of the power of said tone at $f_3$;

embedding said tone at $f_3$ and said tones at $f_0$, $f_1$ and $f_2$ into said frame of said host audio signal;

transmitting said frame of said host audio signal;

inputting next frame of said host audio signal and next two bits of said digital signal to be embedded; and returning to said first step of determining.

8. Method of claim 7, further comprising a steganographic method for recovering embedded data, comprising the steps of:

receiving a digital audio signal containing an embedded digital signal;

dividing said received digital audio signal into non-overlapping frames;

computing the frame power $f_e$ and the frame power at $f_0$, $f_1$, $f_2$ and $f_3$ of each non-overlapping frame of said received digital audio signal;

computing the ratios $(f_e/f_0)$, $(f_e/f_1)$, $(f_e/f_2)$ and $(f_e/f_3)$;

a first step of determining whether $(f_e/f_0)$ is the lowest ratio;

IF $(f_e/f_0)$ is the lowest ratio; THEN declaring the embedded bits to be "00"; and returning to said step of computing the frame power $f_e$ and the frame power at $f_0$, $f_1$, $f_2$ and $f_3$ of next frame of said received digital host audio signal;

OTHERWISE;

a second step of determining whether $(f_e/f_1)$ is the lowest ratio;

IF $(f_e/f_1)$ is the lowest ratio; THEN declaring the embedded bits to be "01"; and returning to said step of computing the frame power $f_e$ and the frame power at $f_0$, $f_1$, $f_2$ and $f_3$ of next frame of said received digital host audio signal;

OTHERWISE;

a third step of determining whether $(f_e/f_2)$ is the lowest ratio;

IF $(f_e/f_2)$ is the lowest ratio; THEN declaring the embedded bits to be "10"; and returning to said step of computing the frame power $f_e$ and the frame power at $f_0$, $f_1$, $f_2$ and $f_3$ of next frame of said received digital host audio signal;

OTHERWISE;

a fourth step of determining whether $(f_e/f_3)$ is the lowest ratio;

IF $(f_e/f_3)$ is the lowest ratio; THEN declaring the embedded bits to be "11"; and returning to said step of computing the frame power $f_e$ and the frame power at $f_0$, $f_1$, $f_2$ and $f_3$ of next frame of said received digital host audio signal.

9. Method of claim 8, wherein said non-overlapping frames are 16 milliseconds in length.

10. Method of claim 7, wherein said non-overlapping frames are 16 milliseconds in length.

11. Method of claim 7, wherein said power of said tone at $f_0$ is 0.05% the power of $f_e$; and said power of said tones at $f_1$, $f_2$ and $f_3$ is 0.001 of the power of said tone at $f_0$ whenever a "00" is to be embedded.

12. Method of claim 7, wherein said power of said tone at $f_1$ is 0.05% the power of $f_e$; and said power of said tones at $f_0$, $f_2$ and $f_3$ is 0.001 of the power of said tone at $f_1$ whenever a "01" is to be embedded.

13. Method of claim 7, wherein said power of said tone at $f_2$ is 0.05% the power of $f_e$; and said power of said tones at $f_0$, $f_1$ and $f_3$ is 0.001 of the power of said tone at $f_2$ whenever a "10" is to be embedded.

14. Method of claim 7, wherein said power of said tone at $f_3$ is 0.05% the power of $f_e$; and said power of said tones at $f_0$, $f_1$ and $f_2$ is 0.001 of the power of said tone at $f_2$ whenever a "11" is to be embedded.

* * * * *